United States Patent [19]

Reyes

[11] Patent Number: 4,957,039
[45] Date of Patent: Sep. 18, 1990

[54] FIVE IN ONE COOKER

[76] Inventor: Clyde L. Reyes, 515 E. Tennessee, Midland, Tex. 79701

[21] Appl. No.: 466,185

[22] Filed: Jan. 17, 1990

[51] Int. Cl.⁵ .............................................. A47J 37/00
[52] U.S. Cl. ........................................ 99/340; 99/397; 99/423; 99/449; 99/450; 99/482; 126/25 R; 126/9 R; 220/212; 220/333
[58] Field of Search ................. 99/339, 340, 352, 357, 99/385, 393, 410, 422–424, 449, 450, 482; 126/25 R, 9 R, 25 A, 25 AA; 220/329, 331, 333, 212; D7/332, 338

[56] References Cited

U.S. PATENT DOCUMENTS

| | | |
|---|---|---|
| D. 248,442 | 7/1978 | Rosenberg . |
| D. 256,763 | 9/1980 | Vincent . |
| D. 257,206 | 10/1980 | Vincent . |
| 2,573,988 | 11/1951 | Saltzberg ............................. 99/340 |
| 2,850,760 | 9/1958 | Vanderwalker .................... 220/333 |
| 2,865,590 | 12/1958 | Greenwell .......................... 220/331 |
| 2,967,023 | 1/1961 | Huckabee ............................ 99/482 |
| 3,228,319 | 1/1966 | Miller ................................. 99/339 |
| 3,354,848 | 11/1967 | Tolston ............................. 126/25 R |
| 3,559,565 | 2/1971 | Getz ................................... 99/340 |
| 3,592,668 | 7/1971 | Denk ................................... 99/330 |
| 4,094,295 | 6/1978 | Boswell et al. . |
| 4,334,462 | 6/1982 | Hefling . |
| 4,363,313 | 12/1982 | Smith . |
| 4,372,198 | 2/1983 | Stover, Jr. et al. ................. 99/340 |
| 4,453,530 | 6/1984 | Schlosser .......................... 126/25 R |
| 4,512,249 | 4/1985 | Mentzel . |
| 4,538,589 | 9/1985 | Preston . |
| 4,562,771 | 1/1986 | Williams ............................. 99/397 |
| 4,587,947 | 5/1986 | Tomita . |

Primary Examiner—Timothy F. Simone

[57] ABSTRACT

A cooker apparatus for simultaneously cooking fajitas in a pan while barbecuing on a grill. The apparatus has an upwardly opening chamber supported at the bottom thereof, and a burner for heating is contained inside of the chamber. The grill is supported inside of the chamber above the burner; and, a special pan that slopes towards the center forms a protective cover when in one position and can be inverted to form a frying pan within which fajitas can be cooked when in another position. The pan is supported at the upper end of the chamber and can be elevated to form an adjustable flue area by which the escape of heat from the chamber is controlled. The pan is pivotally supported for movement towards and away from the chamber to allow access to the interior of the chamber. The pan can also be rotated from a dome configuration into a frying pan configuration so that food can be cooked in the pan while food is simultaneously supported on the grill, and the pan can be elevated above the upper end and pivoted away from the chamber and rotated to pour the contents out of the pan, and can be rotated into a covered configuration to close the upper end of the chamber.

12 Claims, 3 Drawing Sheets

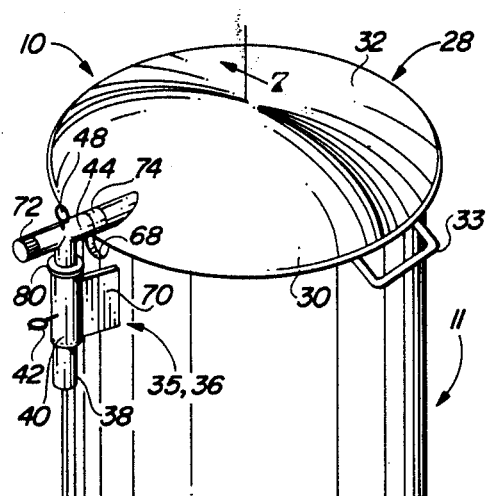
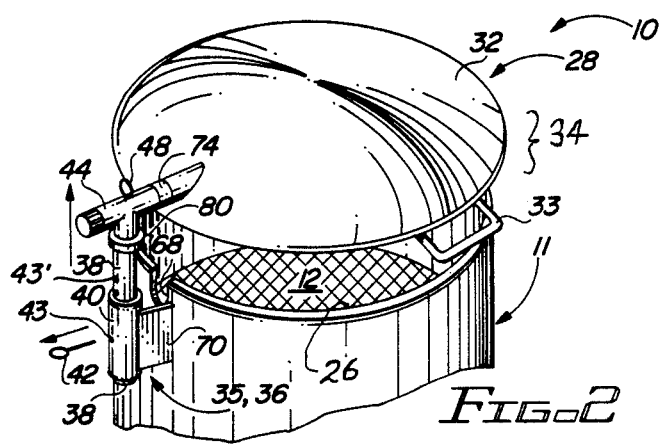
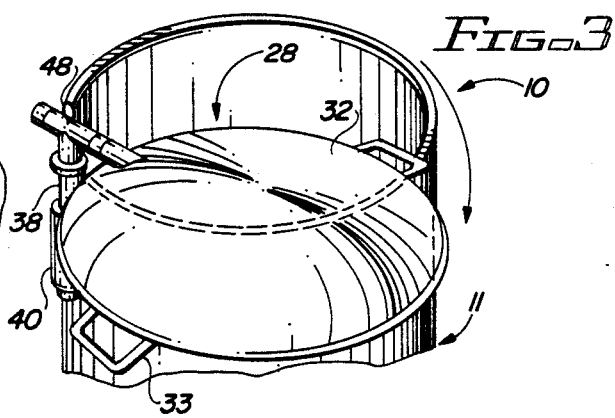
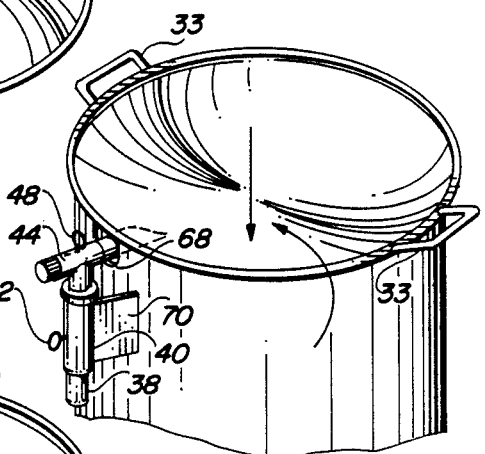

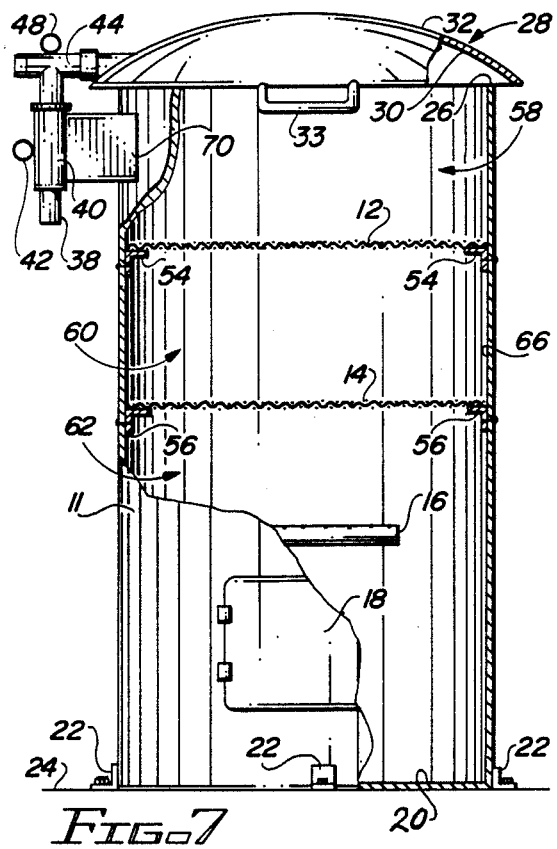
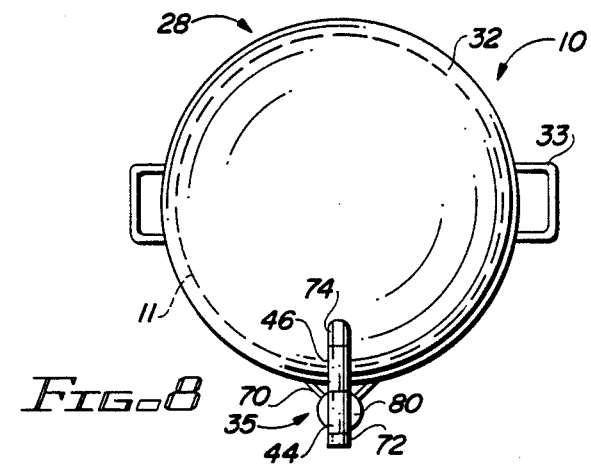
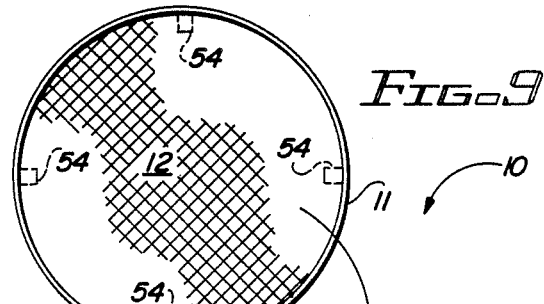
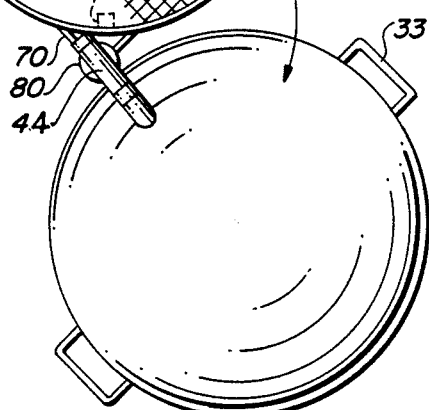
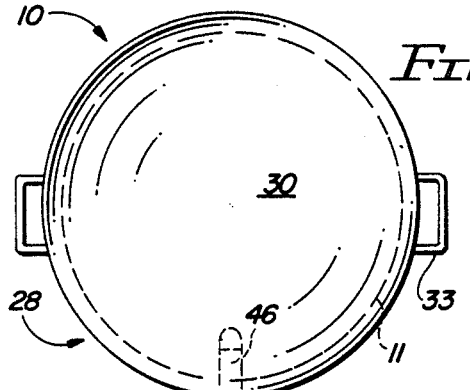
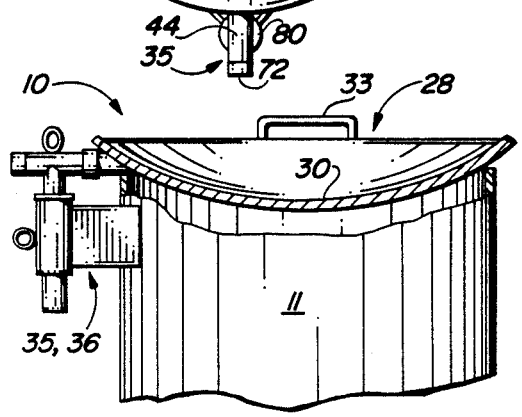
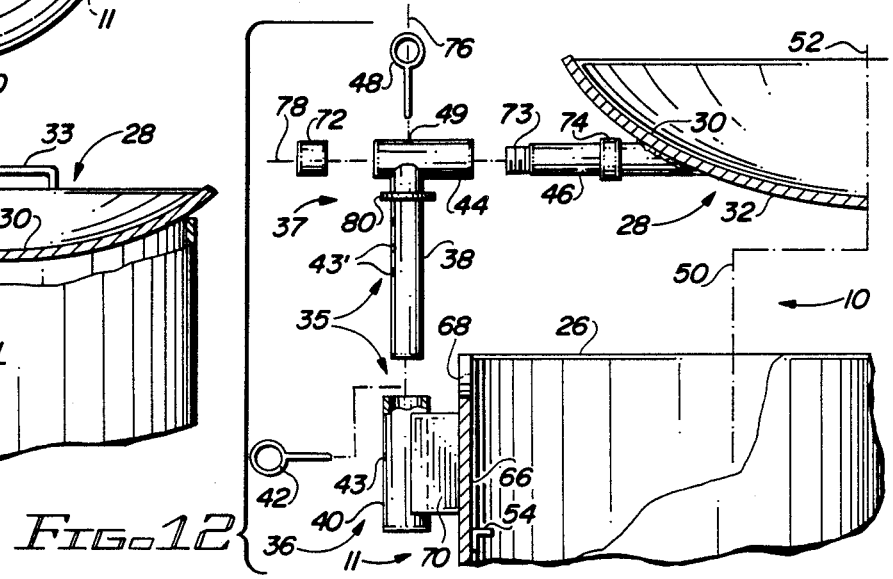

FIVE IN ONE COOKER

BACKGROUND OF THE INVENTION

The preparation of fajitas requires that the meat have various spices, including chili and pepper, incorporated therein, and then the meat must be fried in deep fat over a wood fire so that the wood smoke permeates the fajitas during the cooking process. Accordingly, proper preparation of fajitas requires an outdoor fire, such as associated with a barbecue grill.

It is desirable to have several meat dishes, as for example, barbecued chicken and beef ribs, to supplement the fajitas. A few cooked sausages further enhance any gathering. It is therefore desirable to be able to simultaneously cook fajitas in a frying pan while simultaneously barbecuing several other foods.

The cooking of fajitas requires a carefully controlled temperature in order to distribute the flavor of the peppers and spices throughout the meat while at the same time incorporating the wood smoke flavor into the food product. Accordingly, it would be desirable to be able to utilize a cooking apparatus for simultaneously cooking fajitas and barbecuing various other meat products in the same apparatus while achieving the above desirable cooking features.

SUMMARY OF THE INVENTION

This invention provides an apparatus for carrying out a plurality of cooking functions; and particularly, for simultaneously cooking in two separate locations, and especially for regulating the heat at one of the cooking locations by the provision of a means for controlling the rate at which heat flows thereinto.

More particularly, the invention comprises a combination cooker and barbecue grill apparatus wherein an upwardly, opening chamber has a grill supported therewithin and a frying pan forms a closure member at the upper end of the apparatus.

More specifically, the present invention is directed to a combination barbecue apparatus and fajita fryer, with there being a heating means of special design contained within a chamber located in underlying relationship respective to a grill. A dome shaped closure member is located at the upper end of the chamber which can be inverted to form a pan, and which can be adjusted vertically in order to control the escape of heat energy from the apparatus and at the same time control the temperature of the pan.

Still more specifically, the dome shaped frying pan is supported by apparatus that elevates the pan vertically above the chamber in order to achieve control of the size of the opening between the pan and chamber, and further to enable the pan to be pivotally moved in a horizontal plane away from the chamber, and further to enable the frying pan to be rotated about the horizontal axis to thereby pour the contents therefrom, or to invert the pan into the before recited dome.

Accordingly, a primary object of the present invention is the provision of a cooking apparatus that enables barbecuing and frying to be carried out simultaneously, by the provision of a frying pan at the flue gas outlet of a heating chamber which controls the rate that heat is dissipated from the heating chamber and into the atmosphere.

Another object of the invention is the provision of a combination fajita cooker and barbecue apparatus in the form of a chamber within which a heating means is located, with there being a frying pan that forms a closure member at the upper end thereof which adjusts the size of the outlet through which heat from the heating means escapes; as well a pivot means to enabling the frying pan to be pivoted away from the chamber so that the pan can be tilted to pour the contents therefrom, and whereby the pan can be inverted to provide a dome or closure means at the upper end of the chamber.

A further object of this invention is the provision of a combination fajita cooker and barbecue grill in the form of an upwardly, opening chamber having a plurality of grills supported therewithin with at least one grill being located above a heating means, with there being a dome shaped closure member at the upper outlet end thereof that is adjustable to control the size of the outlet opening, and wherein the dome can be inverted to provide a frying pan, and wherein the frying pan can be pivoted away from the chamber and tilted to pour the contents therefrom.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described herein.

BRIEF DESCRIPTION OF THE DRAWINGS

FIG. 1 is a perspective, side view of a combination fajita cooker and barbecue grill made in accordance with the present invention;

FIGS. 2-6 are broken, perspective, side views of the apparatus disclosed in FIG. 1, with some parts being shown in alternate operative configurations;

FIG. 7 is a side elevational view taken along line 7—7 of FIG. 1, with some parts being broken away therefrom and some of the remaining parts being shown in cross-section;

FIG. 8 is a top, plan view of the apparatus disclosed in the foregoing figures;

FIG. 9 is a top, plan view representation of the apparatus disclosed in the foregoing figures and showing the apparatus in an alternant operative configuration;

FIG. 10 is a top, plan view of the apparatus disclosed in the foregoing figures, with some parts being shown in an alternant configuration;

FIG. 11 is a broken, side view of the apparatus disclosed in FIG. 10;

FIG. 12 is an exploded, broken, part cross-sectional view of the apparatus disclosed in FIGS. 1-11;

DETAILED DESCRIPTION OF THE PREFERRED EMBODIMENT

Figure 13:
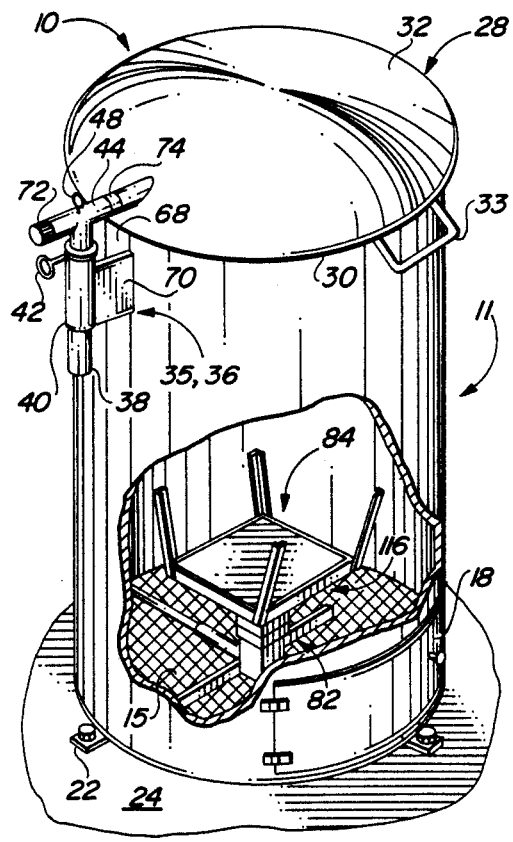
FIG. 13 is a perspective, side view of a combination fajita cooker and barbecue grill made in accordance with the present invention.

The figures of the drawings disclose a barbecue grill apparatus 10 for frying fajitas as well as barbecuing various food stuff. The apparatus includes an upwardly opening chamber 11 having a circumferentially extending sidewall within which a pair of spaced apart grills 12 and 14 are removably supported in superimposed relationship above a heating means 16. The grills 12 and 14 can take on any number of different forms and it is advantageous to support food stuff on either or both of grills 12 and 14 as well as being able to support food stuff on grill 12 while selected barbecuing wood, such as mesquite, is supported on grill 14.

A cleanout door 18 enables ashes and other debris to be removed from the lower end 20 of the chamber 11. Anchor lugs 22 radiate from the lower end of chamber 11 to enable the entire barbecue apparatus 10 to be anchored to a concrete pad 24.

The chamber 11 has an upper end 26 which receives a movable closure member 28 thereagainst. The closure member 28 has a pan side 30 opposed to a dome side 32. The closure member 28 has opposed handles 33 affixed to the periphery thereof. The closure member 28 is spaced from the upper end 26 and the intervening space 34 controls the rate of escaped heat from the interior of chamber 11 and therefore forms a control for the flow of heat and smoke from the intervening space 34.

Numeral 35 broadly indicates a support means by which the closure member 28 is adjustably affixed respective to the upper end 26 of chamber 11. The support means 35 includes an adjustment member 36 located adjacent the upper end of chamber 11. The support means 35 further includes an adjustment member 37 located adjacent the peripheral edge of closure member 28. The adjustment members 36 and 37 jointly form the support means 35.

The adjustment member 36 includes a sleeve 40 vertically oriented and attached externally of chamber 11, at a location near the upper terminal end 26. Locking device 42, preferably in the form of the illustrated pin, locks vertical shaft 38 against movement respective to chamber 11 when placed in aperture 43, and pivotally supports the vertical shaft 38 respective to chamber 11 when placed in one of apertures 43'.

As shown in FIG. 12, a horizontal sleeve 44 slidably receives a horizontal shaft 46 therethrough. Horizontal shaft 46 is affixed to closure member 28. A locking device 48, similar to locking device 42, removably extends through an aperture 49 of horizontal sleeve 44 and horizontal shaft 46, and thereby secures closure member 28 against rotational movement respective to the longitudinal axis of horizontal sleeve 44.

In FIG. 12, numeral 50 indicates the longitudinal vertical axis of chamber 11 while numeral 52 indicates the central axis of the closure member 28. The central axis 52 coincides with the longitudinal axis 50 when the closure member is in the closed position.

Figure 14:
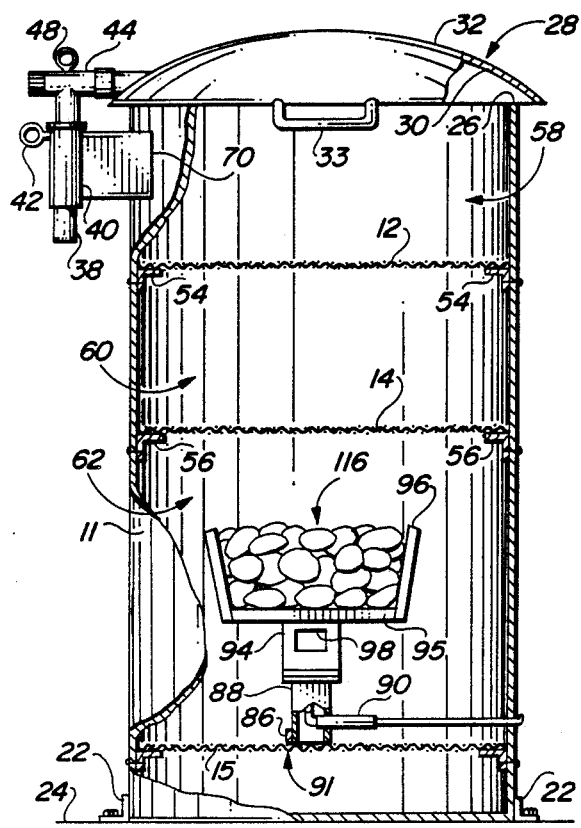
FIG. 14 is a side elevational view of FIG. 1, with some parts being broken away therefrom and some of the remaining parts being shown in cross-section.

As seen in FIGS. 7 and 14 a plurality of circumferentially spaced support lugs 54 are spaced from similar support lugs 56, which are affixed to the interior wall surface of chamber 11. Grills 12 and 14 divide the interior of chamber 11 into an upper enclosure 58, central enclosure 60 and lower enclosure 62. Numeral 66 indicates the circumferentially extending inner wall surface of chamber 11. The upper end 26 of chamber 11 is cutout at 68 to form a detent that receives horizontal sleeve 44 therein, much like a cradle, and thereby aligns axis 50 and 52 with one another as the weight of the closure member causes the sleeve to gravitate to the lowest part of the cutout 68.

As shown in FIG. 12, a reinforcing web 70 rigidly attaches vertical sleeve 40 to the exterior of chamber 11. Numeral 72 indicates a keeper that threadedly engages horizontal shaft 46 at threads 73, while abutment means 74 abuttingly engages the near end of horizontal sleeve 44. Numeral 76 indicates the vertical axis of vertical shaft 38 and sleeve 40. Numeral 78 indicates the horizontal axis about which closure member 28 is rotated. Stop member 80 abuttingly engages the upper end of vertical sleeve 40.

FIG. 13 discloses a lowermost support 15 having a combination smoker and burner 116 supported thereon. Support 15 is in the form of a third grill, and can be arranged in underlying relationship respective to other grills, as for example 12 and 14 of FIG. 14. The combination smoker and burner 116 includes a lower burner section 82 that supports an upper smoker section 84.

Figure 15:
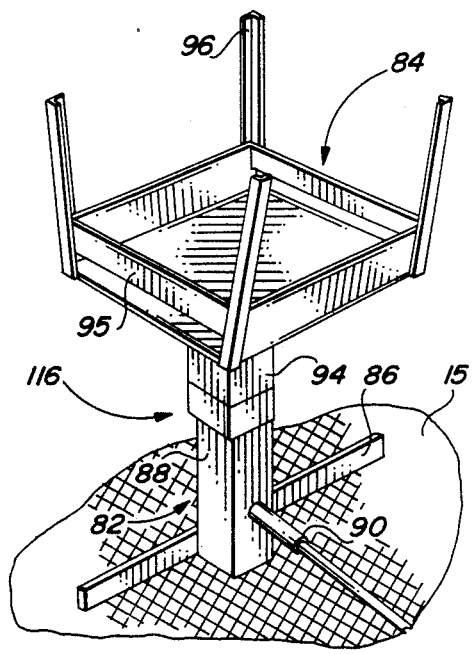
FIG. 15 is a perspective view of a burner and smoker device.

In FIG. 15, lateral member 86 attaches to hollow burner member 88 for steadying the entire combination smoker and burner assembly 116. Gas inlet 90 is attached to a combustion nozzle which is centered within hollow burner member 88.

Figure 16:
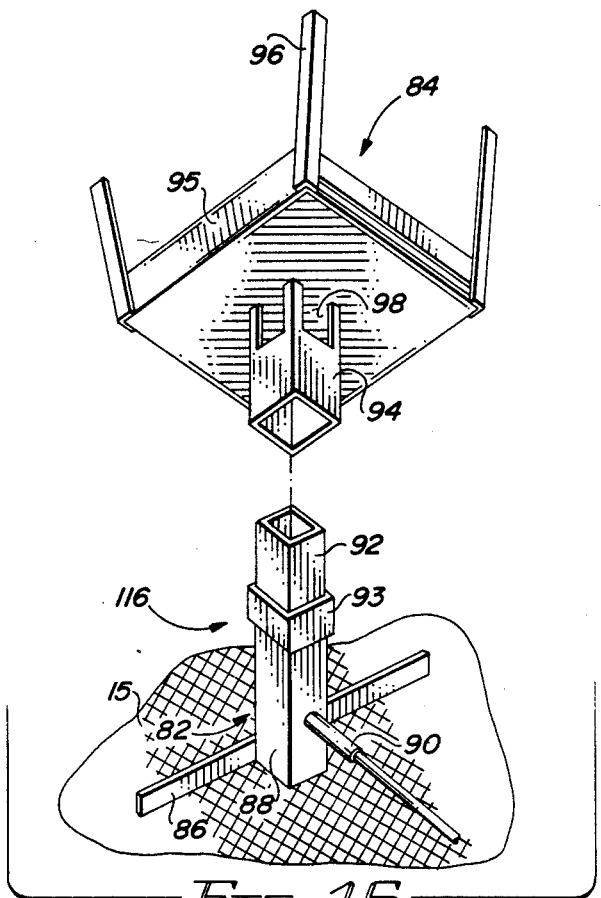
FIG. 16 is a partially disassembled view of the device shown in FIG. 15.

Male extension 92 of FIG. 16 is provided with stop member 93 for abuttingly engaging female member 94 when members 92, 94 are telescoped together. The smoker section 84 includes a metal pan 95 that is centrally attached to the upper end of female support member 94. Upwardly extending radially spaced wood support members 96 are attached at the corners of pan 95 and support a suitable supply of wood within pan member 95.

Combustion gas outlet ports 98 are formed within the upper marginal end of female member 94 and provide energy for smoking the wood contained within the upper smoker section 84. The combustion gas outlet ports extend radially from female member 94.

Cleanout door 18 provides access to the interior of the upwardly opening chamber so that wood can be added to the wood holder, and ashes that accumulate in the lower part of the chamber can be removed from the apparatus.

OPERATION

The apparatus of the present invention preferably is stored in the dormant configuration, with the dome shaped closure member 28 tightly fitted against upper end 26 of chamber 11 when the apparatus is not being used. In use, cleanout door 18 is opened to make certain that the interior is in proper condition for receiving food stuff. The heating means 16 is ignited to sterilize the grill 12 and the frying pan 30. During this time, it may be necessary to slightly elevate the closure member 28 respective to chamber 11, by loosening locking device 42 and lifting the closure member. The closure member is secured against movement by replacing locking device 42 in aperture 43 and one of the apertures 43'; or supported for pivotal movement by placing locking device 42 in one of apertures 43'.

Next, the closure member 28 is rotated away from chamber 11 in the manner of FIGS. 4 or 9. This is achieved by loosening locking device 42, rotating the closure member, and refastening locking device 42 into another position.

At this time, food stuff such as chicken, fish or beef can be placed on grill 12, and, if desired, wood, such as oak or mesquite, can be placed on grill 14. Sometimes it is desirable to delay placement of food on the grill 12 until the proper time has arrived during the subsequent cooking of the fajitas in pan 30.

Next, locking device 48 is loosened to enable the dome to be inverted to thereby present a frying pan 30. Next, locking device 42 is loosened and the frying pan rotated from the position of FIG. 5 into the position of FIGS. 6, 10 or 11. At this time, the intervening space 34 should be adjusted for optimum usage of the heating means 16 and mesquite wood at 14, and further so that the proper heat is transferred into frying pan 30.

Prepared raw fajitas are fried by placing cooking oil or fat within frying pan 30. It is preferred that pan 30 be partially filled with oil so that the cooked fajitas can be pulled up the sloped wall toward the rim 31 of the frying pan. This enables oil and juices to drain back into the bottom of the pan and thereby reduce the fat content of the meat as well as to enhance serving hot food stuff.

After the fajitas have drained, the frying pan can be tilted in the manner of FIG. 5 in order to retrieve the oil and to discharge the entire contents of the pan into any suitable receptacle (not shown). This is achieved by loosening locking device 48 and tilting the frying pan until all of the contents, including the grease, is drained therefrom. The frying pan is thereafter returned to the dome configuration and moved into the illustrated position of FIG. 1. Prior to returning the apparatus to the stored configuration, all of the food is removed from grill 12.

It is sometimes desirable to cook or toast tortillas on the outer surface of the dome 32. Further, food can be placed on the grill 12 in order to maintain the food at an elevated temperature. When used as a food warmer, the heating means 16 can be turned to a low heat and the intervening space 34 reduced to a minimum opening.

The present invention provides a combination fajita cooker and barbecue grill for simultaneously cooking diverse food stuff. The fajita cooker further provides a means by which the egress of heat generated by the heating means is controlled. Further, the frying pan can be inverted to provide a dome upon which tortillas can be cooked and which protects the interior of the cooking apparatus during the time it is not in use. Moreover, the frying pan can be moved completely out of the path of the chamber opening where hot food stuff can be poured therefrom by rotatably tilting the frying pan so that the contents thereof pour into another container.

The apparatus of the present invention conserves energy by enabling a dual cooking function to be carried out. Moreover, the simultaneous use of a fuel supply for barbecuing and frying fajitas provides the fajitas with an improved flavor depending upon the wood that is placed on grill 14.

It is contemplated that charcoal can be placed on grill 14 in lieu of using the heating means 16. Moreover, where deemed desirable, grills 12 and 14 can be used for holding food stuff while a charcoal or wood fire is maintained in the lower enclosure 62 of chamber 11.

The present invention enables the cooking apparatus 10 to be used as a conventional barbecue grill by placing food stuff to be cooked on grill 12 and utilizing heating means 16; or the heating means 16 in conjunction with wood placed on grill 14; or alternatively, charcoal placed on grill 14 can be used as the sole heating means.

Furthermore, fajitas can simultaneously be cooked in deep fat by inverting the dome 32 in order to present a pan 30 for holding hot oil within which the fajitas are placed. This enables the aroma of the wood smoke from grill 14 to become impregnated in the meat food being cooked.

In the embodiment of FIGS. 13-16, the burner 116 is easily ignited through cleanout door 18. Mesquite wood is loaded onto the smoker assembly and the heat from burner 82 regulated to achieve the desired temperature gradient within chamber 11. The smoker 84 will provide an adequate supply of smoke from a small wood supply. Air supply 91 admixes with fuel at the nozzle at gas inlet 90 and the resultant combustion products exit at ports 98 to heat metal pan 95 and the wood supported therein.

I claim:

1. A combination fajitas cooker and barbecue grill apparatus comprising an upwardly opening chamber having a lower end opposed to an upper end, a support base at said lower end, heating means supported within said chamber, a grill, means supporting said grill within said chamber in spaced relationship respective to said upper and said lower end, and a closure member attached to said upper end;

said closure member is in the form of a dome having a circumferentially extending peripheral edge portion from which said closure member upwardly slopes to form the dome when in one operative position and which can be inverted to form a frying pan within which fajitas can be cooked;

support means by which said closure member is supported by said chamber and by which said closure member can be selectively elevated above said upper end and thereby form an adjustable flue by which the escape of heat from the interior of said chamber can be controlled;

said support means further enables said closure member to be pivoted in a horizontal plane whereby said closure member can be pivoted towards and away from the longitudinal vertical axis of said chamber, said support means further pivotally supports said closure means for rotation about a horizontal axis whereby the closure member can be rotated from a dome configuration into a frying pan configuration; whereby:

food can be cooked in said pan while other food is simultaneously supported on said grill, and said pan can be elevated above said upper end to control the heat received from said heating means, and said pan can be pivoted away from said chamber and rotated to pour the contents thereof out of the pan, and said closure member can be rotated from a pan configuration into a dome configuration and lowered to close the upper end of said chamber.

2. The combination of claim 1 wherein there are two grills spaced from one another and located above said heating means and dividing said chamber into a lower heating chamber and two adjacent food containing chambers.

3. The combination of claim 1 wherein there are two grills spaced from one another and the lower grill can be used as a heating means while the upper grill can be used to support food to thereby simultaneously barbecue on the grill while frying in the pan.

4. The combination of claim 1 wherein said support means comprises a horizontal shaft affixed to said closure member, a vertical sleeve attached to said chamber, a vertical shaft received within the vertical sleeve, a horizontal sleeve affixed to the upper end of said vertical shaft and receives the horizontal shaft therein.

5. The combination of claim 4 wherein there are two grills spaced from one another and located above said heating means and dividing said chamber into a lower heating chamber and two adjacent food containing chambers;

the lower grill allows heat means to be placed thereon while the upper grill allows food be supported thereon and to thereby barbecue on the upper grill while frying in the pan.

6. The combination of claim 4 wherein there are two grills spaced from one another and the lower grill provides a heat source while the upper grill provides a food support to thereby simultaneously barbecue on one grill while frying in the pan.

7. A cooker apparatus for simultaneously cooking fajitas in a pan while barbecuing on a grill, said apparatus comprising an upwardly opening chamber having a support base at the lower end thereof, and a means for heating is contained within said chamber; a grill, means supporting said grill within said chamber in spaced relationship respective to said upper end and said heating means; and, a closure member attached for movement respective to said upper end;

said closure member upwardly slopes to form a protective cover when in one operative position and which can be inverted to form a frying pan within which fajitas can be cooked;

means by which said closure member is supported at said upper end of said chamber in a manner that enables said closure member to be selectively elevated above said upper end and thereby form an adjustable annular area by which the escape of heat from said chamber is controlled;

said support means further pivotally supports said closure member for pivotal movement that describes a horizontal plane whereby said closure member can be pivoted towards and away from the longitudinal vertical axis of said chamber and thereby gain access to the interior of said chamber, said support means further pivotally supports said closure means for rotation about a horizontal axis whereby the closure member can be rotated from said one operative position into a frying pan configuration; whereby:

food can be cooked in said pan while food is simultaneously supported on said grill, and said pan can be elevated above said upper end to control the heat received from said heating means, and said pan can be pivoted away from said chamber and rotated to pour the contents thereof out of the pan, and said closure member can be rotated into a covered configuration to close the upper end of said chamber.

8. The combination of claim 7 wherein there are two grills spaced from one another and located above said heating means and dividing said chamber into a lower heating chamber and two adjacent food containing chambers.

9. The combination of claim 7 wherein there are two grills spaced from one another and the lower grill allows heat to be generated thereon while the upper grill allows food to be placed thereon, thereby barbecuing on the grill while frying in the pan.

10. The combination of claim 7 wherein said support means comprises a horizontal shaft affixed to said closure member, a vertical sleeve attached to said chamber, a vertical shaft received within the vertical sleeve, a horizontal sleeve affixed to the upper end of the shaft and receives horizontal shaft therein.

11. The combination of claim 10 wherein there are two grills spaced from one another and located above said heating means and dividing said chamber into a lower heating chamber and two adjacent food containing chambers;

the lower grill can support a heating means while the upper grill can support food to thereby barbecue on the upper grill while frying in the pan.

12. The combination of claim 7 wherein there are two grills spaced from one another and the lower grill allows a source of heat to be supported thereon while the upper grill allows food to be supported thereon to thereby barbecue on a grill while frying in the pan.

* * * * *